(12) United States Patent
Hueda et al.

(10) Patent No.: US 11,424,834 B2
(45) Date of Patent: *Aug. 23, 2022

(54) TAP CENTERER METHOD AND STRUCTURE FOR COHERENT OPTICAL RECEIVER

(71) Applicant: Marvell Asia Pte, Ltd., Singapore (SG)

(72) Inventors: Mario R. Hueda, San Jose, CA (US); José Correa, San Jose, CA (US); Oscar E. Agazzi, San Jose, CA (US)

(73) Assignee: Marvell Asia Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,900

(22) Filed: Feb. 3, 2021

(65) Prior Publication Data

US 2021/0159986 A1    May 27, 2021

Related U.S. Application Data

(63) Continuation of application No. 16/669,239, filed on Oct. 30, 2019, now Pat. No. 10,944,485, which is a (Continued)

(51) Int. Cl.
*H04B 10/61* (2013.01)
*H04L 25/03* (2006.01)
(Continued)

(52) U.S. Cl.
CPC ....... *H04B 10/6162* (2013.01); *H04B 10/079* (2013.01); *H04B 10/615* (2013.01);
(Continued)

(58) Field of Classification Search
CPC .............. H04B 10/6162; H04B 10/079; H04B 10/615; H04B 10/616; H04B 10/6161;
(Continued)

(56) References Cited

U.S. PATENT DOCUMENTS

| | | |
|---|---|---|
| 4,669,116 A | 5/1987 | Agazzi et al. |
| 5,870,372 A | 2/1999 | Kuribayashi |

(Continued)

OTHER PUBLICATIONS

Agazzi, et al., "Maximum-Likelihood Sequence Estimation in Dispersive Optical Channels," IEEE, Journal of Lightwave Technology, 2005, vol. 23 (2), pp. 749-763.

(Continued)

*Primary Examiner* — Dalzid E Singh

(57) ABSTRACT

A method and structure for tap centering in a coherent optical receiver device. The center of gravity (CG) of the filter coefficients can be used to evaluate a proper convergence of a time-domain adaptive equalizer. However, the computation of CG in a dual-polarization optical coherent receiver is difficult when a frequency domain (FD) adaptive equalizer is adopted. In this case, the implementation of several inverse fast-Fourier transform (IFFT) stages is required to back time domain impulse response. Here, examples of the present invention estimate CG directly from the FD equalizer taps and compensate for an error of convergence based off of the estimated CG. This estimation method and associated device architecture is able to achieve an excellent tradeoff between accuracy and complexity.

20 Claims, 5 Drawing Sheets

Related U.S. Application Data continuation of application No. 16/153,341, filed on Oct. 5, 2018, now Pat. No. 10,498,462, which is a continuation of application No. 15/792,582, filed on Oct. 24, 2017, now Pat. No. 10,128,959.

(60) Provisional application No. 62/412,002, filed on Oct. 24, 2016, provisional application No. 62/412,015, filed on Oct. 24, 2016, provisional application No. 62/412,033, filed on Oct. 24, 2016, provisional application No. 62/412,071, filed on Oct. 24, 2016, provisional application No. 62/412,047, filed on Oct. 24, 2016, provisional application No. 62/412,052, filed on Oct. 24, 2016, provisional application No. 62/412,039, filed on Oct. 24, 2016.

(51) Int. Cl.

| | | |
|---|---|---|
| *H04L 7/00* | (2006.01) | |
| *H04L 27/26* | (2006.01) | |
| *H04B 10/079* | (2013.01) | |
| *H04L 1/00* | (2006.01) | |
| *H04B 10/40* | (2013.01) | |

(52) U.S. Cl.
CPC ....... *H04B 10/616* (2013.01); *H04B 10/6161* (2013.01); *H04B 10/6165* (2013.01); *H04L 1/0045* (2013.01); *H04L 7/0075* (2013.01); *H04L 25/03019* (2013.01); *H04L 25/03159* (2013.01); *H04L 27/2662* (2013.01); *H04L 27/2697* (2013.01); *H04B 10/40* (2013.01); *H04L 27/2634* (2013.01)

(58) Field of Classification Search
CPC ................ H04B 10/6165; H04B 10/40; H04L 1/0045; H04L 7/0075; H04L 25/03159; H04L 25/2662; H04L 25/2697; H04L 25/2634
USPC .......................................................... 398/208
See application file for complete search history.

(56) References Cited

U.S. PATENT DOCUMENTS

| | | | |
|---|---|---|---|
| 7,693,214 | B2 | 4/2010 | Shida |
| 7,894,728 | B1 | 2/2011 | Sun et al. |
| 8,244,142 | B2 | 8/2012 | Wagner et al. |
| 8,565,621 | B2 | 10/2013 | Ibragimov et al. |
| 8,634,726 | B2 | 1/2014 | Zhang et al. |
| 8,655,191 | B2 | 2/2014 | Kaneda et al. |
| 8,687,974 | B2 | 4/2014 | Zelensky et al. |
| 8,693,897 | B2 | 4/2014 | Mo |
| 8,712,247 | B2 | 4/2014 | Hauske |
| 8,731,413 | B1 | 5/2014 | Dave et al. |
| 8,873,358 | B2 | 10/2014 | Saito et al. |
| 9,077,572 | B1* | 7/2015 | Hueda ................ H04L 25/03292 |
| 10,128,959 | B1 | 11/2018 | Hueda et al. |
| 10,498,462 | B2 | 12/2019 | Hueda et al. |
| 10,944,485 | B2 | 3/2021 | Hueda et al. |
| 2006/0013590 | A1 | 1/2006 | Hueda et al. |
| 2007/0206963 | A1 | 9/2007 | Koc |
| 2008/0175590 | A1 | 7/2008 | Perkins et al. |
| 2009/0148164 | A1 | 6/2009 | Roberts |
| 2009/0201796 | A1 | 8/2009 | Roberts |
| 2009/0252497 | A1 | 10/2009 | Younce et al. |
| 2010/0196009 | A1* | 8/2010 | Qian .................. H04B 10/6162 398/65 |
| 2010/0329677 | A1 | 12/2010 | Kaneda et al. |
| 2011/0064421 | A1 | 3/2011 | Zhang et al. |
| 2011/0150506 | A1 | 6/2011 | Tanimura et al. |
| 2011/0229127 | A1 | 9/2011 | Sakamoto et al. |
| 2011/0268459 | A1 | 11/2011 | Rollins et al. |
| 2012/0096061 | A1 | 4/2012 | Hauske |
| 2012/0114341 | A1* | 5/2012 | Hu ..................... H04B 10/6162 398/208 |
| 2012/0177156 | A1 | 7/2012 | Hauske et al. |
| 2012/0213510 | A1 | 8/2012 | Stojanovic |
| 2012/0219302 | A1 | 8/2012 | Sun et al. |
| 2012/0257652 | A1 | 10/2012 | Malipatil et al. |
| 2012/0269513 | A1 | 10/2012 | Abe |
| 2012/0288275 | A1 | 11/2012 | Zhang et al. |
| 2013/0039665 | A1 | 2/2013 | Hauske |
| 2013/0084080 | A1 | 4/2013 | Shibutani |
| 2013/0202021 | A1* | 8/2013 | Zhang .................. H04L 27/223 375/232 |
| 2013/0209089 | A1 | 8/2013 | Harley et al. |
| 2013/0230311 | A1 | 9/2013 | Bai |
| 2013/0243127 | A1 | 9/2013 | Chmelar et al. |
| 2013/0251082 | A1 | 9/2013 | Abe |
| 2013/0259490 | A1 | 10/2013 | Malouin et al. |
| 2013/0308960 | A1* | 11/2013 | Horikoshi .......... H03H 21/0012 398/209 |
| 2013/0336647 | A1 | 12/2013 | Le Taillandier De Gabory et al. |
| 2013/0343490 | A1 | 12/2013 | Wertz et al. |
| 2014/0161470 | A1 | 6/2014 | Zelensky et al. |
| 2014/0254644 | A1 | 9/2014 | Gotman et al. |
| 2015/0171972 | A1 | 6/2015 | Xie |
| 2015/0280853 | A1 | 10/2015 | Sun |
| 2015/0372764 | A1* | 12/2015 | Kaneda .............. H04B 10/6162 398/115 |
| 2016/0182182 | A1 | 6/2016 | Schmogrow |
| 2016/0197681 | A1 | 7/2016 | Sun |
| 2019/0123834 | A1* | 4/2019 | Zarubinsky .......... H04B 7/0413 |

OTHER PUBLICATIONS

Agazzi, et al., Timing Recovery in Digital Subscriber Loops, IEEE, Transactions on Communications, 1985, vol. 33 (6), pp. 558-569.

Crivelli, et al., "Adaptive Digital Equalization in the Presence of Chromatic Dispersion, PMD, and Phase Noise in Coherent Fiber Optic Systems," IEEE, Global Telcommunications Conference, 2004, pp. 2545-2551.

El-Chammas, et al., "A 12-GS/s 81-mW 5-bit Time-Interleaved Flash ADC With Background Timing Skew Calibration," IEEE, Journal of Solid-State Circuits, 2011, vol. 46 (4), pp. 838-847.

Geyer, et al., "Optical Performance Monitoring Using a 43Gb/S Realtime Coherent Receiver (Invited)," IEEE, 2009, pp. 93-94.

Geyer, et al., "Performance Monitoring Using Coherent Recievers," IEEE, 2009, pp. 3.

Greshishchev, et al., "A 40GS/s 6b ADC in 65nm CMOS," IEEE, ISSCC, 2010, pp. 390-392.

Hauske, et al., "Optical Performance Monitoring in Digital Coherent Receivers," IEEE, Journal of Lightwave Technology, 2009, vol. 27 (16), pp. 3623-3631.

Kuschnerov, et al., "DSP for Coherent Single-Carrier Receivers," IEEE, Journal of Lightwave Technology, 2009, vol. 27 (16), pp. 3614-3622.

Leven, et al., "Real-Time Implementation of Digital Signal Processing for Coherent Optical Digital Communication Systems," IEEE, ournal of Selected Topics in Quantum Electronics, 2010, vol. 16 (5), pp. 1227-1234.

Messerschmitt, "Frequency Detectors for PLL Acquisition in Timing and Carrier Recovery," IEEE, Transactions on Communications, 1979, vol. 27 (9), pp. 1288-1295.

Moon, et al., "Timing Recovery in CMOS Using Nonlinear Spectral-Line Method," IEEE, Proceedings of Custom Integrated Circuits Conference, 1996, pp. 13-16.

Nelson, et al., "Performance of a 46-Gbps Dual-Polarization QPSK Transceiver With Real-Time Coherent Equalization Over High PMD Fiber," IEEE, Journal of Lightwave Technology, 2009, vol. 27 (3), pp. 158-167.

Pfau, et al., "Hardware-Efficient Coherent Digital Receiver Concept With Feedforward Carrier Recovery for M-QAM Constellations," IEEE, Journal of Lightwave Technology, 2009, vol. 27 (8), pp. 989-999.

Viterbi, "Nonlinear Estimation of PSK-Modulated Carrier Phase with Application to Burst Digital Transmission," IEEE, Transactions on Information Theory, 1983, vol. 29 (4), pp. 543-551.

(56) References Cited

OTHER PUBLICATIONS

Wu, et al., "Iterative Carrier Recovery in Turbo Receivers with Distributed Pilots," IEEE, CECNet, 2011, pp. 5024-5026.
Zhang, et al., "Cycle Slip Mitigation in POLMUX-QPSK Modulation," Optical Fiber Communication Conference and Exposition and the National Fiber Optic Engineers Conference, 2011, pp. 3.
Zhang, et al., "Pilot-Assisted Decision-Aided Maximum-Likelihood Phase Estimation in Coherent Optical Phase-Modulated Systems With Nonlinear Phase Noise," IEEE, Photonics Technology Letters, 2010, vol. 22 (6), pp. 380-382.

* cited by examiner

TAP CENTERER METHOD AND STRUCTURE FOR COHERENT OPTICAL RECEIVER

CROSS-REFERENCES TO RELATED APPLICATIONS

The present application is a continuation of U.S. application Ser. No. 16/669,239, filed Oct. 30, 2019, which is a continuation of U.S. application Ser. No. 16/153,341, filed Oct. 5, 2018, now issued as U.S. Pat. No. 10,498,462 on Dec. 3, 2019, which is a continuation of U.S. application Ser. No. 15/792,582, filed Oct. 24, 2017, now issued as U.S. Pat. No. 10,128,959 on Nov. 13, 2018, which claims priority to and incorporates by reference, for all purposes, the following U.S. provisional patent applications: U.S. Provisional App. No. 62/412,052, filed on Oct. 24, 2016; U.S. Provisional App. No. 62/412,071, filed on Oct. 24, 2016; U.S. Provisional App. No. 62/412,033, filed on Oct. 24, 2016; U.S. Provisional App. No. 62/412,047, filed on Oct. 24, 2016; U.S. Provisional App. No. 62/412,015, filed on Oct. 24, 2016; U.S. Provisional App. No. 62/412,002, filed on Oct. 24, 2016; and U.S. Provisional App. No. 62/412,039, filed on Oct. 24, 2016. The present application also incorporates by reference, for all purposes, the following U.S. patents: U.S. Pat. No. 9,337,934, filed on Nov. 29, 2013, and issued on May 10, 2016; U.S. Pat. No. 9,178,625, filed on Dec. 3, 2013, and issued on Nov. 3, 2015; and U.S. Pat. No. 9,077,572, filed on Jan. 17, 2013, and issued on Jul. 7, 2015.

BACKGROUND OF THE INVENTION

The present invention relates to communication systems and integrated circuit (IC) devices. More particularly, the present invention provides for improved methods and devices for optical communication.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Optical communication is one major technological area that is growing to address these high demands on data. Optical communication systems typically communicate data over a plurality of channels corresponding to different phases and/or polarizations of the optical signal. While the data communicated over the different channels is typically aligned relative to a common clock when transmitted by the transmitter, delay (or skew) may be introduced into one or more of the channels based on characteristics of the transmitter, receiver, and/or the optical fiber. As a result, the relative timing of the data in the various channels may be misaligned at the receiver, causing degradation of the recovered data.

Although there are several types of devices and methods related to optical communication systems, they have been inadequate for the advancement of various applications. Conventional embodiments consume large areas or large amounts of power and suffer from performance limitations. Therefore, improved devices and methods for optical communication systems and related electronics are highly desired.

BRIEF SUMMARY OF THE INVENTION

The present invention relates to communication systems and integrated circuit (IC) devices. More particularly, the present invention provides for improved methods and devices for optical communication.

The center of gravity (CG) of the filter coefficients can be used to evaluate a proper convergence of a time-domain adaptive equalizer. Examples of the present invention provide for structures and methods of estimating the CG directly from the FD equalizer taps and compensate for an error of convergence based off of the estimated CG.

In an example, the present invention provides a coherent optical receiver device. The device includes an input signal; a chromatic dispersion (CD) equalizer module being configured to compensate for CD affecting the input signal; and a polarization mode dispersion (PMD) equalizer module being configured to compensate for PMD affecting the input signal following compensation by the CD equalizer module. The PMD equalizer module having a plurality of PMD taps and is coupled to the CD equalizer and a least means square (LMS) module. The device can also include an interpolated timing recovery (ITR) module coupled to the PMD equalizer module and an error evaluation module coupled to the ITR module. The ITR module is configured to synchronize the input signal. The LMS module is coupled to the error evaluation module, the CD equalizer module, and the PMD equalizer module, and the LMS module is configured to filter the input signal.

In an example, the error evaluation module is configured to iteratively adjust a determinant of a frequency-domain (FD) coefficient-based matrix to minimize an error of convergence. The error evaluation module can also be configured to estimate a group delay $n_d$ from the plurality of PMD taps. In a specific example, the error evaluation module includes an iterator module coupled in a loop to a phase error module, a loop filter module, and a feedback module. The iterator module is configured to compute an iterative function $\rho_{k+1}(\Omega_m, 0)$; the phase error module is configured to adjust the error of convergence $\Delta n_d$ of the input signal resulting in an adjusted input signal; the loop filter is configured to filter the adjusted input signal; and the feedback module is configured to provide the adjusted input signal to the iterator module.

In an example, the present invention provides a method of operating a coherent optical receiver device. The method can include providing an input signal; compensating, by a chromatic dispersion (CD) equalizer module, for CD affecting the input signal; and compensating, by a polarization mode dispersion (PMD) equalizer module for PMD affecting the input signal following compensation by the CD equalizer module. The PMD equalizer module can have a plurality of PMD taps and be coupled to the CD equalizer and a least means square (LMS) module. The method can include synchronizing, by an interpolated timing recovery (ITR) module coupled to the PMD equalizer module, the input signal and filtering, by the LMS module, the input signal, where the LMS module is coupled to the error evaluation module, the CD equalizer module, and the PMD equalizer module.

In an example, the method includes iteratively adjusting, by an error evaluation module coupled to the ITR module, a determinant of a frequency-domain (FD) coefficient-based matrix to minimize an error of convergence. The iterative adjustment can include estimating, by the error evaluation module, the group delay $n_d$ from the plurality of PMD taps. In a specific example, the error evaluation module includes iterator module coupled in a loop to a phase error module, a loop filter module, and a feedback module; further, the iterative adjustment of the determinant of the FD coefficient-based matrix includes computing, by an iterator module, the iterative function $\rho_{k+1}(\Omega_m, 0)$; adjusting, by the phase error module, the error of convergence $\Delta n_d$ of the input signal resulting in an adjusted input signal; filtering, by the loop filter, the adjusted input signal; and providing, by the feedback module, the adjusted input signal to the iterator module.

The tap centering algorithm described above can be used to estimate CG directly from the FD equalizer taps and compensate for an error of convergence based off of the estimated CG. This estimation method and associated device architecture is able to achieve an excellent tradeoff between accuracy and complexity. Those of ordinary skill in the art will recognize other variations, modifications, and alternatives.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention the presently described embodiments and the presently understood best mode of the invention are described with additional detail through the use of the accompanying drawings in which.

DETAILED DESCRIPTION OF THE INVENTION

Figure 1:
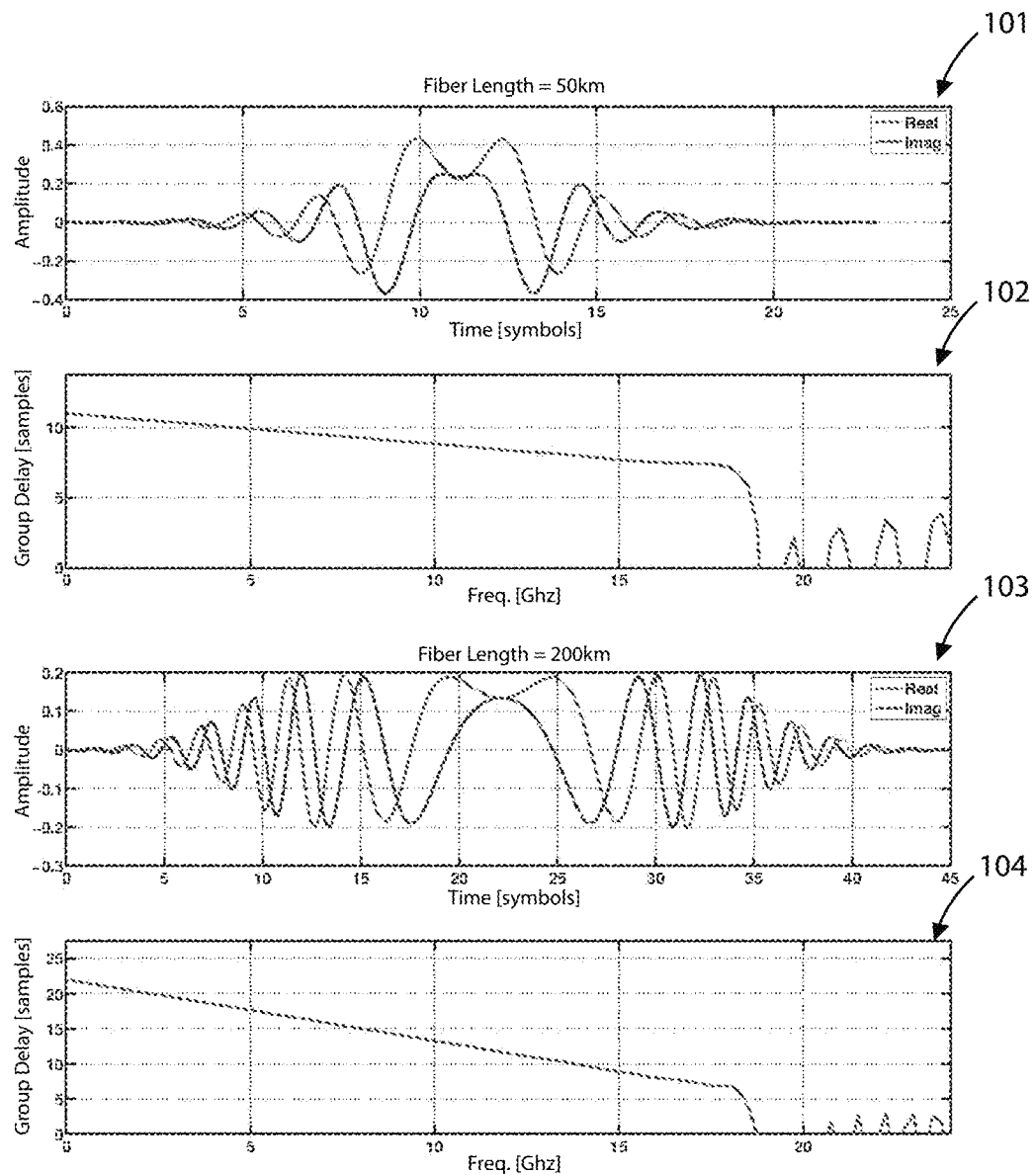
FIG. 1 is a simplified set of graphs illustrating the impulse response and group delay according to an example of the present invention.

The present invention relates to communication systems and integrated circuit (IC) devices. More particularly, the present invention provides for improved methods and devices for optical communication.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

The center of gravity (CG) of the filter coefficients can be used to evaluate a proper convergence of a time-domain adaptive equalizer. Examples of the present invention provide for structures and methods of estimating the CG directly from the FD equalizer taps and compensate for an error of convergence based off of the estimated CG. The derivation of the relevant algorithms is provided below.

I. Evaluation of the Center of Gravity

Let f(n) be the discrete time, causal, impulse response of the fractional spaced equalizer. The CG of f(n) is defined as follows:

$$c_g = \frac{\sum_{n=0}^{\infty} n |f(n)|^2}{\sum_{n=0}^{\infty} |f(n)|^2} \quad (1)$$

This equation can be used as a measure of the proper convergence of the equalizer. The following derivations produce a simple method to estimate CD based on the taps of the frequency domain equalizer.

A. Evaluation of the CG in the Presence of Chromatic Dispersion (CD)

In the presence of chromatic dispersion (CD), the Fourier transform (FT) of f(n) can be defined as follows:

$$F(\Omega) = |F(\Omega)| e^{jn_d\Omega - j\beta\chi^2} \quad (2)$$

where $n_d$ is the group delay at $\Omega = 0$ and $\beta$ is the CD parameter. Without loss of generality, it can be assumed that $|F(\Omega)|$ is the magnitude of an ideal low-pass filter (i.e., a rectangular pulse in the frequency domain).

Let x(n) be a sequence with FT given by $X(\Omega)$. Then, it is verified that the FT of nx (n) results in $$j\frac{dX(\Omega)}{d\Omega}.$$

The real function x(n) is defined as follows:

$$x(n)=n|f(n)|^2 \quad (3)$$

with FT given by the following:

$$X(\Omega) = j\frac{d}{d\Omega}\left[\frac{1}{2\pi}\int_{-\pi}^{\pi}F(\Theta)F^*(\Theta-\Omega)d\Theta\right] \quad (4)$$

$$= \frac{1}{2\pi}\int_{-\pi}^{\pi}F(\Theta)\left[j\frac{d}{d\Omega}F^*(\Theta-\Omega)\right]d\Theta$$

with the FT of $|f(n)|^2$ being $$\left[\frac{1}{2\pi}\int_{-\pi}^{\pi}F(\Theta)F^*(\Theta-\Omega)d\Theta\right].$$

Since $X(\Omega)=\tau_n x(n)e^{-j\Omega n}$, then $X(0)$ is as follows:

$$X(0) = \sum_n x(n) = \sum_{n=0}^{\infty} n|f(n)|^2 \quad (5)$$

Next, the FT of the sequence $x(n)=n|f(n)|^2$ at $\Omega=0$ (i.e., $X(0)$). Since $|F(\Omega)|$ is assumed to have an ideal low-pass response (i.e., its derivative is zero at $\Omega=0$; this assumption is also valid for practical filters such as raised cosine pulses), the result is as follows:

$$\lim_{\Omega\to 0} j\frac{d}{d\Omega}\{-j[2\beta(\Theta-\Omega)+n_d]|F(\Theta-\Omega)|e^{jn_d(\Theta-\Omega)+j\beta(\Theta-\Omega)^2}\} = \quad (6)$$

$$(2\beta\Theta+n_d)|F(\Theta)|e^{jn_d\Theta+j\beta\Theta^2}$$

Replacing (6) in (4), and taking into account that $|F(\Theta)|^2$ is an even function, the following is obtained:

$$X(0) = \sum_{n=0}^{\infty} n|f(n)|^2 = \frac{1}{2\pi}\int_{-\pi}^{\pi}(2\beta\Theta+n_d)|F(\Theta)|^2 d\Theta \quad (7)$$

$$= n_d\left[\frac{1}{2\pi}\int_{-\pi}^{\pi}|F(\Theta)|^2 d\Theta\right]$$

$$= n_d\sum_{n=0}^{\infty}|f(n)|^2$$

Finally, the center of gravity (1) reduces to the following:

$$c_g = \frac{\sum_{n=0}^{\infty}n|f(n)|^2}{\sum_{n=0}^{\infty}|f(n)|^2} \quad (8)$$

$$= \frac{X(0)}{\sum_{n=0}^{\infty}|f(n)|^2}$$

$$= n_d$$

From (8), the CG of the time-domain impulse response f(n) can be easily derived from the group delay of $F(\Omega)$ at $\Omega=0$.

B. Numerical Results

FIG. 1 shows the impulse response (graphs 101 and 103) and the group delay (graphs 102 and 104 for two optical channels with chromatic dispersion: 850 ps/nm (50 km) in graphs 101 and 102; and 3400 ps/nm (200 km) in graphs 103 and 104. Baud rate is 32 GBd. A raised cosine filter with roll-off factor of 20% is used. Here, it is verified that the GD at $\Omega=0$ (~11 and 22 samples for 50 and 200 km, respectively) agrees very well with the center of the impulse response (i.e., ~the center of gravity).

Figure 2:
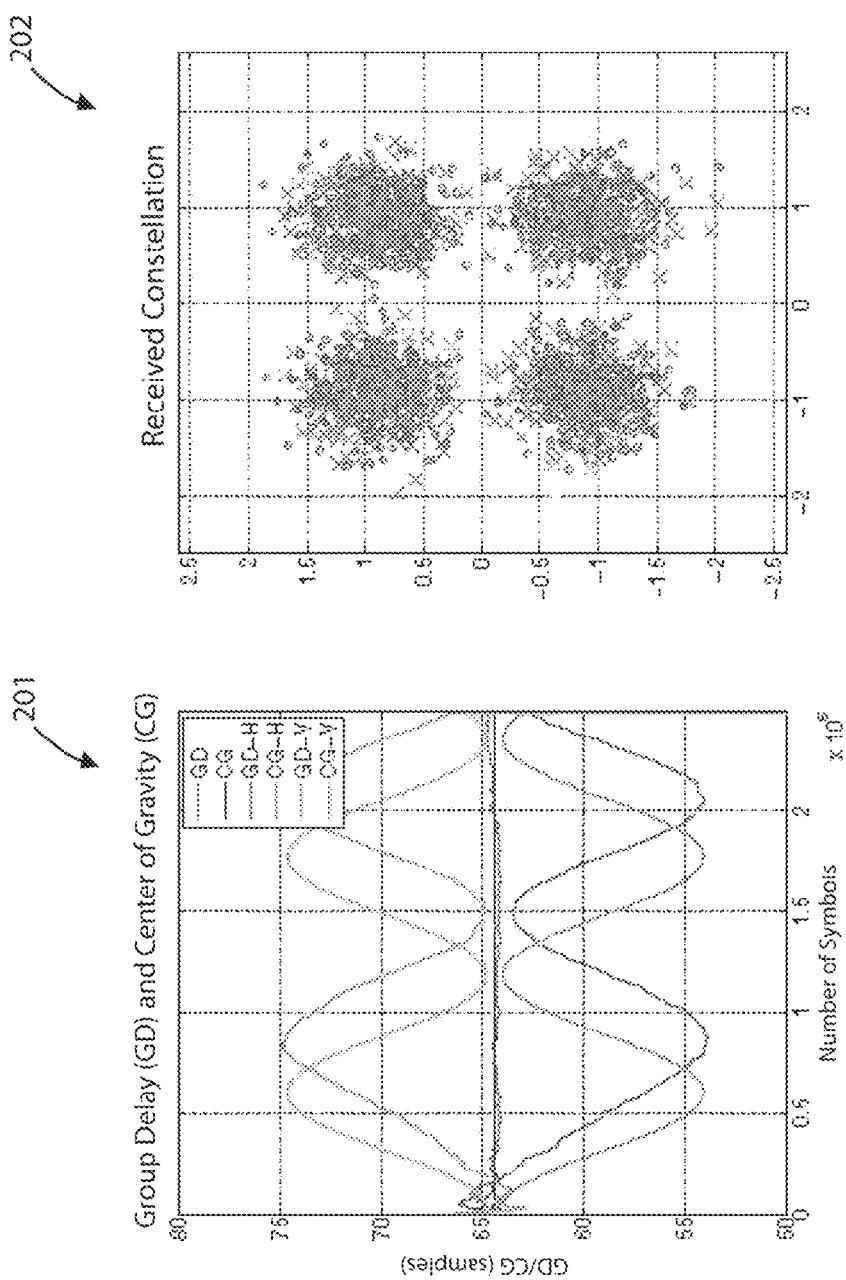
FIG. 2 is a simplified set of graphs illustrating simulation results of the center of gravity and the group delay according to an example of the present invention.

FIG. 2 provides simulation results of the center of gravity and the group delay $\Omega=0$ for a frequency domain, multiple-input multiple-output, frequency spreading equalizer (FD-MIMO-FSE) with quadrature phase shifting keying (QPSK) modulation (graph 201). FIG. 2 also depicts the received constellation at the equalizer output (graph 202). An FS-MIMO-FSE with 128 taps, 50% overlap (i.e., $N_{fft}=256$), and oversampling (OS) of 4/3 is considered. A tap leakage algorithm is used. The baud rate is 1/T=32 GBd and the optical signal to noise ratio (OSNR) is 14 dB. The simulation results consider an optical channel with variable differential group delay (DGD) between 0 and 468 ps with a low-pass filter for different values of the low-pass filter (LPF) parameter ($\beta$). In FIG. 2, the LPF parameter is $f3=2^{-12}$. The evolution of the DGD and CG is similar in all cases. Also, the total CG remains approximately constant around 64. On the other hand, the CG for a given polarization follows the variation of the DGD very well (i.e., 234 ps is ~10 samples at T/OS). Further, the fluctuations of the GD estimation can be mitigated by reducing the bandwidth of the low-pass filter at the expense of higher latency.

II. Center-Tap Algorithm

A. Timing Recovery based on the Taps of Adaptive FD Equalizers

Let $F(\Omega_m)$ be the frequency domain coefficient of the MIMO-FSE at a certain frequency $\Omega_m$ such that $0<\Omega_m OS/T<\pi/T$. The MIMO FD coefficient can be expressed as follows:

$$F(\Omega_m)=e^{-jn_d\Omega_m-j\tau\Omega_m-j\beta\Omega_m^2}e^{j\phi}P(\Omega_m)J(\Omega_m) \quad (9)$$

where $\tau$ is the sampling phase error, $n_d$ is the group delay at $\Omega=0$ and $\tau=0$ (i.e., no sampling phase error; also, from (8), assume $c_9=n_d$), $\beta$ is the CD parameter, $\phi$ is an arbitrary phase, $P(\Omega_m)$ is a real positive number related to the magnitude of the frequency response of the impulse response of the electrical filter used for both polarizations, while $J(\Omega_m)$ is a 2×2 unitary Jones matrix. Let $e^{j\theta(\Omega)}G(\Omega)$ be the frequency response of a filter with $G(\Omega)$ and $\theta(\Omega)$ denoting the magnitude and the phase response, respectively. The zero-forcing equalizer response results in $F(\Omega_m)=e^{-j\theta(\Omega)}P(\Omega)$ with $P(\Omega)=1/G(\Omega)$.

Note the following equation:

$$F(-\Omega_m)=e^{-jn_d\Omega_m-j\tau\Omega_m+j\beta\Omega_m^2}e^{-j\phi}P(-\Omega_m)J^H(-\Omega_m) \quad (10)$$

where $^H$ denotes transpose and complex conjugation. From (9) and (10), a 2×2 matrix $M_f(\Omega_m)$ can be defined as follows:

$$M_f(\Omega_m) = F(\Omega_m)F^H(-\Omega_m) \quad (11)$$

$$= e^{-j2n_d\Omega_m - j2\tau\Omega_m} P(\Omega_m) J(\Omega_m) J^H(-\Omega_m) \quad (12)$$

The determinant of $M_f(\Omega_m)$ results in the following:

$$\rho(\Omega_m) = \det\{M_f(\Omega_m)\} = e^{-j4n_d\Omega_m - j4\tau\Omega_m} \mathcal{P}(\Omega_m) \quad (13)$$

where $\mathcal{P}(\Omega_m) = (P(\Omega_m)P(-\Omega_m))^2$ is real and positive. In general, the sampling phase $\tau$ changes with time, therefore the determinant can be rewritten as follows:

$$\rho(\Omega_m) = e^{-j4n_d\Omega_m - j4\tau(t)\Omega_m} \mathcal{P}(\Omega_m) \quad (14)$$

Without loss of generality, it can be assumed that the sampling phase error at t=0 is zero (i.e., $\rho(\Omega_m, 0) = e^{-j4n_d\Omega_m} \mathcal{P}(\Omega_m)$). Thus, the angle of the product is as follows:

$$\rho(\Omega_m, t)\rho^*(\Omega_m, 0) = e^{-j4\tau(t)\Omega_m} \mathcal{P}^2(\Omega_m) \quad (15)$$

Here, (15) provides an estimate of the sampling phase error at instant t, which can be used for timing recovery.

B. Center-Tap Algorithm

Next, it is assumed that the FD equalization is achieved by using an overlap-and-save technique. Without loss of generality, we also assume that the overlap factor is 50%; therefore, the time domain impulse response has $N_{fft}/2$ taps. In an ideal situation, the center of gravity should be half the number of taps, that is, $n_d = N_{fft}/4$ taps. However, as a result of an imperfect start-up procedure (e.g., interaction between the timing recovery stage and the adaptive equalizer), the CG of the time-domain equalizer response may be shifted to a certain side. The latter effect may cause performance degradation; therefore, an algorithm to center the equalizer taps is required.

We define the error of convergence as follows:

$$\Delta n_d = n_d - N_{fft}/4 \quad (16)$$

Note that the optimal convergence is experienced when the CG (or $n_d$) is $N_{fft}/4$, that is, when $\Delta n_d = 0$. From (16), the determinant (14) at instant t=0 can be expressed as follows:

$$\rho(\Omega m, 0) = e^{-j4\Delta n_d \Omega_m 31\, jN_{fft}\Omega_m} \mathcal{P}(\Omega_m) \quad (17)$$

A timing recovery stage based on (15) seeks to keep to zero the phase error with respect to the reference (17). Therefore, in order to minimize the "convergence error" $\Delta n_d$, the reference (35) is iteratively adjusted by using the following:

$$\rho_{k+1}(\Omega_m, 0) = \rho_k(\Omega_m, 0)e^{j\alpha\Delta\hat{n}_d(k)} \quad (18)$$

$$= \rho_k(\Omega_m, 0)e^{j\alpha\Sigma_{i=0}^k \hat{n}_d(i)} \quad (19)$$

where $\alpha$ is a small positive gain and $\Delta\hat{n}_d(k)$ is the error of convergence at the k-th iteration ($\Delta\hat{n}_d(0) = \Delta n_d$) given by the following:

$$\Delta\hat{n}_d(k) = \hat{n}_d(k) - N_{fft}/4 \quad (20)$$

with $\hat{n}_d(k)$ being the group delay at $\Omega=0$ at the k-th iteration, which is estimated as described in Section I. From (17) note that (19) can be thought of as a first-order PLL designed to compensate a (constant) phase error of $-4\Delta n_d\Omega_m$ (see FIG. 3). Then, it is verified that $$\lim_{k\to\infty} \Delta\hat{n}_d(k) = 0 \text{ while } \lim_{k\to\infty} \rho_k(\Omega_m, 0) = e^{-jN_{fft}\Omega_m} \mathcal{P}(\Omega_m).$$

Figure 3:
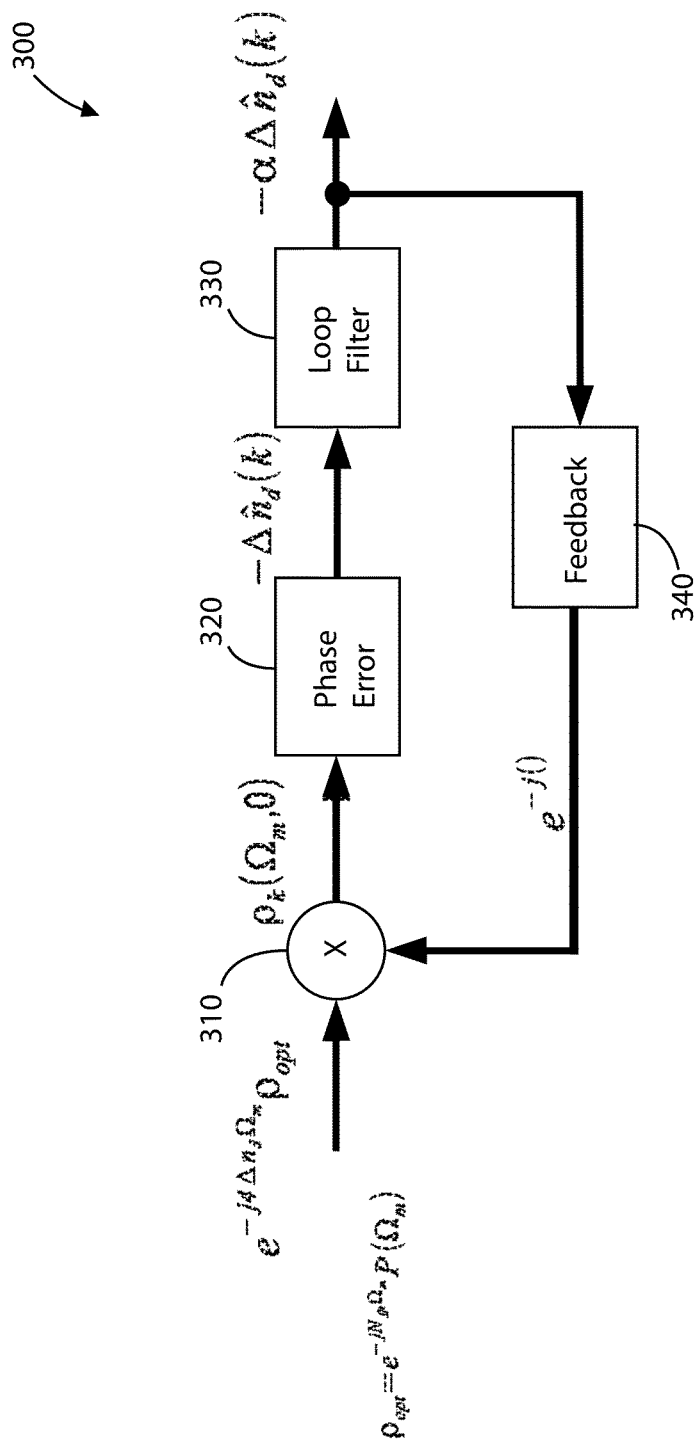
FIG. 3 is a simplified diagram illustrating an error evaluation module according to an example of the present invention.

As a result of the high latency in the "phase error" computation block of FIG. 3 due to the equalizer adaptation, the centered process (18) should be done slowly (e.g., $\alpha \ll 1$). As shown, error evaluation module 300 includes an iterator module 310 coupled in a loop to a phase error module 320, a loop filter module 330, and a feedback module 340. In an example, the error evaluation module 300, which can be implemented in a timing recovery module, is configured to estimate the group delay $n_d$ from the plurality of PMD taps. In a specific example, estimating the group delay $n_d$ is accomplished using two of the plurality of PMD taps. In a specific example, these modules implement the algorithms described previously. The iterator module is configured to compute $\rho_{k+1}(\Omega_m, 0)$ and the phase error module is configure dot adjust the error of convergence $\Delta n_d$ of the input signal resulting in an adjusted input signal. The loop filter is configured to filter the adjusted input signal and the feedback module is configured to provide the adjusted input signal to the iterator module. Those of ordinary skill in the art will recognize other variations, modifications, and alternatives.

Figure 4:
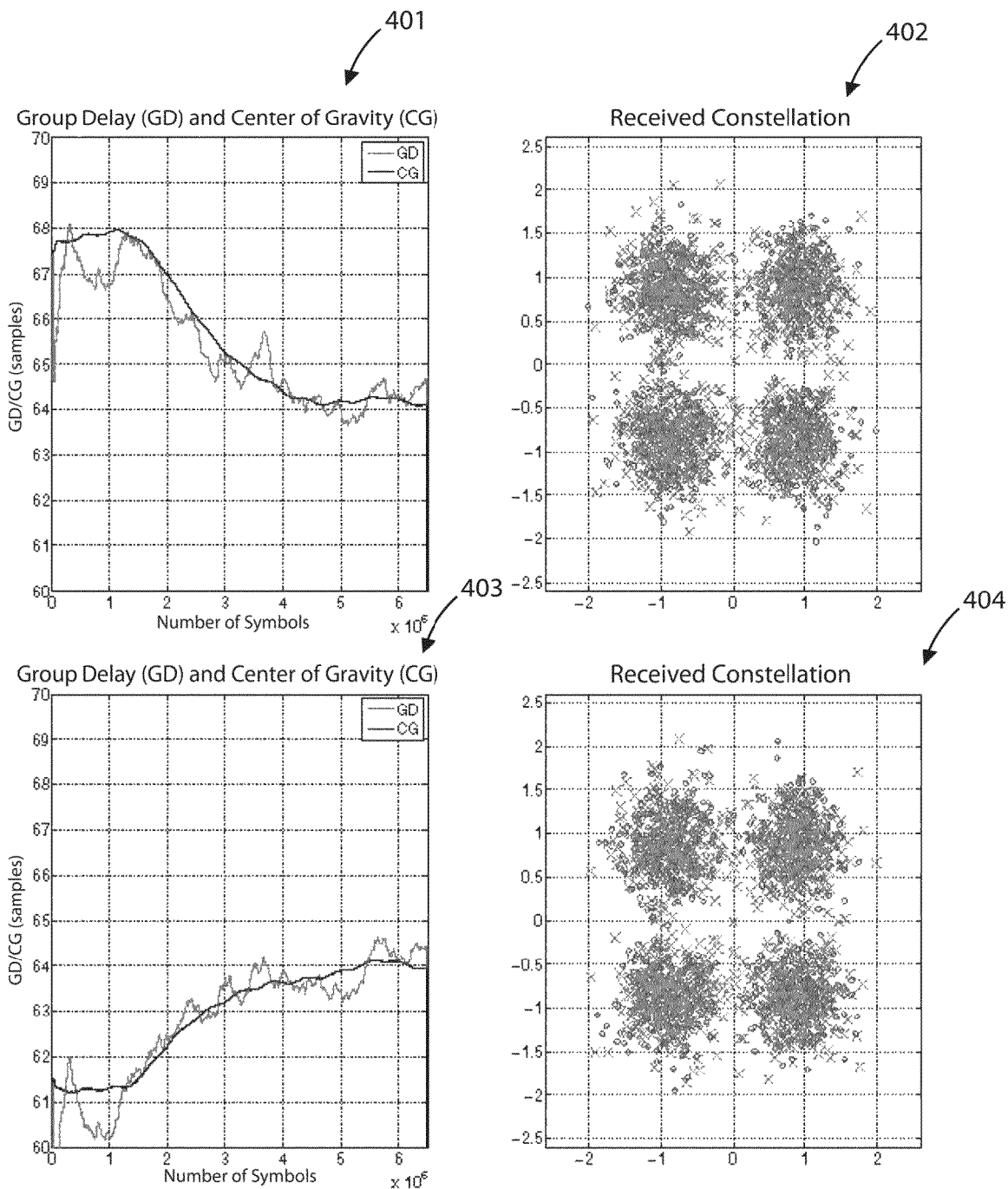
FIG. 4 is a simplified set of graphs illustrating simulation results of the center of gravity and the group delay according to an example of the present invention.

FIG. 4 shows two sets of graphs (401/402 and 403/404), each with the group delay and CG on one graph and the received constellation on another graph. FIG. 4 shows an example with $N_{fft}=256$ where the equalizer taps are initialized with an "error of convergence" ($\Delta n_d$) of −4 (graphs 401 and 402) and −3 (graphs 403 and 404). The update process (18) was carried out every 4000 data symbols with $\alpha=2^{-7}$. In both cases, it is verified that the center of gravity at regime tends to the optimal value $n_d=N_{fft}/4=64$.

Figure 5:
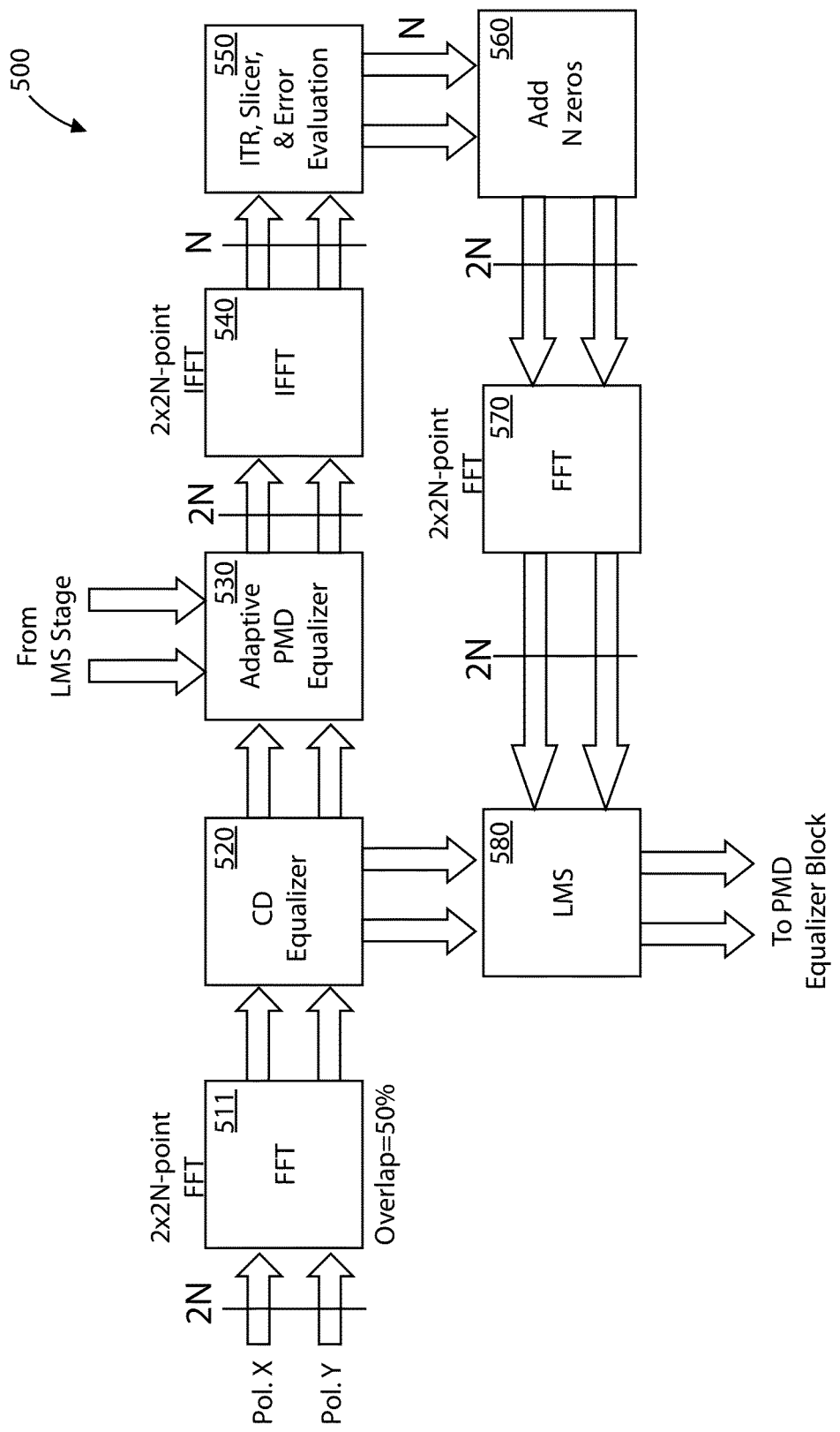
FIG. 5 is a simplified diagram illustrating a block diagram of a coherent optical receiver according to an example of the present invention.

FIG. 5 is a simplified diagram illustrating a block diagram of a coherent optical receiver according to an example of the present invention. As shown, device 500 can include an input signal; a first fast Fourier transform (FFT) module receiving the input signal, the first FFT module 511 being configured to compute a first discrete Fourier transform (DFT) of the input signal; a chromatic dispersion (CD) equalizer module 520 coupled to the first FFT module 511, the CD equalizer module 520 being configured to compensate for CD affecting the input signal; a polarization mode dispersion (PMD) equalizer module 530 coupled to the CD equalizer and a least means square (LMS) module 580, the PMD equalizer module 530 being configured to compensate for PMD affecting the input signal following compensation by the CD equalizer module. The PMD equalizer module 530 includes a plurality of PMD taps. In a specific example, the CD equalizer module includes a non-adaptive frequency-domain (FD) equalizer, and the PMD equalizer module includes an adaptive FD equalizer. Further, the input can be a dual polarization input with an x-type and y-type inputs.

In an example, the device can also include an inverse FFT (IFFT) module 540 coupled to the PMD equalizer module 530, the IFFT module being configured to compute an inverse DFT of the input signal; an interpolated timing recovery (ITR), slicer, and error evaluation module 550 coupled to the IFFT module 540. The ITR, slicer, and the error evaluation can be separate modules, the ITR module being configured to retime the input signal, the slicer module being configured to derive the data stream, and the error evaluation module being configured to retime the input signal. The error evaluation module can include a structure and function similar to that shown in FIG. 3.

In an example, the device can include a zero padding module 560 coupled to the slicer and error evaluation module 550, the zero padding module 560 being configured to increase a sampling rate of the input signal; and a second FFT module 570 coupled to the zero padding module 560, the second FFT module 570 being configured to compute a second DFT of the input signal. In an example, the LMS module 580 is coupled to the second FFT module 570, the CD equalizer module 520, and the PMD equalizer module 530. The LMS module 580 outputs to the PMD equalizer module 530 and is configured to filter the input signal. Those of ordinary skill in the art will recognize other variations, modifications, and alternatives.

The reduction of complexity results from not having to use separate FD BCD and FFE equalizers. As shown in FIG. 5, only one (dual polarization) FFT and only one (dual polarization) IFFT are required in the signal path. An architecture using separate FD blocks for the BCD and FFE requires extra FFTs and IFFTs as a result of going back and forth from the frequency domain to the time domain. Further, the LMD update can be viewed as computing a correlation between the input signal and the error. Here, this correlation is computed in the frequency domain, which reduces complexity the same way as in convolution computations.

With this architecture, an interaction problem arises when TR is achieved after the adaptive equalizer (i.e., PMD equalizer). This problem occurs because the adaptation algorithm of the equalizer and the timing-synchronizer use the same (equalized) signal as their input. The equalizer tries to compensate the misadjustment of the discrete time impulse response due to the sampling phase error, while the TR tries to equalize the distortion of the impulse response by changing the sampling phase. As a consequence, the timing phase and the equalizer taps are drifting. Conventional solutions to this problem have severe drawbacks in (time variant) coherent optical channels. Making the timing loop much faster than the equalizer can mitigate this interaction problem, but the timing phase may still drift slowly over long periods of time.

According to an example of the present invention, a tap centering algorithm can be used to estimate CG directly from the FD equalizer taps and compensate for an error of convergence based off of the estimated CG. This estimation method and associated device architecture is able to achieve an excellent tradeoff between accuracy and complexity.

In an example, the present invention provides a method of operating a coherent optical receiver device. The method can include providing an input signal; computing, by a first fast Fourier transform (FFT) module receiving the input signal, a first discrete Fourier transform (DFT) of the input signal. The method can include compensating, by a chromatic dispersion (CD) equalizer module coupled to the first FFT module, for CD affecting the input signal; and compensating, by a polarization mode dispersion (PMD) equalizer module coupled to the CD equalizer module and coupled to a least means square (LMS) module and having a plurality of PMD taps, for PMD affecting the input signal following the compensation by the CD equalizer module. Further, the method can include computing, by an inverse FFT (IFFT) module coupled to the PMD equalizer module, an inverse DFT of the input signal. In an example, the method includes filtering, by the LMS module coupled to the CD equalizer module and the second FFT module and the PMD equalizer module, the input signal.

In an example, the method includes iteratively adjusting, by an error evaluation module coupled to the ITR module, a determinant of a frequency-domain (FD) coefficient-based matrix to minimize an error of convergence. The iterative adjustment can include estimating, by the error evaluation module, the group delay $n_d$ from the plurality of PMD taps. In a specific example, the error evaluation module includes iterator module coupled in a loop to a phase error module, a loop filter module, and a feedback module; further, the iterative adjustment of the determinant of the FD coefficient-based matrix includes computing, by an iterator module, the iterative function $\rho_{k+1}(\Omega_m, 0)$; adjusting, by the phase error module, the error of convergence $\Delta n_d$ of the input signal resulting in an adjusted input signal; filtering, by the loop filter, the adjusted input signal; and providing, by the feedback module, the adjusted input signal to the iterator module.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of operating a coherent optical receiver device, the method comprising:
   compensating, using a compensation module having a plurality of taps, an input signal to generate a compensated input signal;
   calculating a determinant of a frequency-domain (FD) coefficient-based matrix using a plurality of tap signals from among the plurality of taps;
   adjusting an error of convergence $\Delta n_d$ of the compensated input signal to generate an adjusted input signal;
   filtering the adjusted input signal to generate a filtered input signal; and
   iteratively adjusting the determinant of the FD coefficient-based matrix based on the filtered input signal to minimize the error of convergence.

2. The method of claim 1 wherein the input signal is a dual-polarization input with an x-type polarization input and a y-type polarization input.

3. The method of claim 1 wherein the compensation module includes a non-adaptive frequency-domain (FD) equalizer, an adaptive FD equalizer, or both.

4. The method of claim 1
   further comprising adjusting the determinant according to the following equation:

$$\rho_{k+1}(\Omega_m, 0) = \rho_k(\Omega_m, 0) e^{j\alpha \sum_{i=0}^{k} \Delta \hat{n}_d(i)}$$

where $\rho_k(\Omega_m, 0) = e^{-j4\Delta n_d \Omega_m} e^{-jN_{ff} \Omega_m} (P(\Omega_m)P(-\Omega_m))^2$, where $$\Delta n_d = n_d - \frac{N_{fft}}{4},$$

where $n_d$ is a group delay at impedance $\Omega=0$,
where $N_{fft}/2$ is the number of the plurality of taps, and
where $P(\Omega_m)$ is a real positive number related to the magnitude of the frequency response of the input signal.

5. The method of claim 4, further comprising estimating the group delay $n_d$ from the plurality of taps.

6. The method of claim 1 wherein compensating the input signal includes
   compensating for chromatic dispersion (CD) affecting the input signal; and
   compensating for polarization mode dispersion (PMD) affecting the input signal;
   wherein the plurality of taps includes a plurality of PMD taps configured to compensate for PMD.

7. The method of claim 1 further comprising
   increasing a sampling rate of the input signal; and
   deriving a data stream from the input signal.

8. A method of operating a processor of an optical receiver device, the method comprising:
   calculating a determinant of a frequency-domain (FD) coefficient-based matrix using a plurality of tap signals;
   adjusting an error of convergence $\Delta n_d$ of a compensated input signal resulting in an adjusted input signal;
   filtering the adjusted input signal resultin n a filtered input signal; and
   providing the filtered input signal to iteratively adjust the determinant of the FD coefficient-based matrix to minimize the error of convergence.

9. The method of claim 8 wherein the compensated input signal is a dual-polarization input with an x-type polarization input and a y-type polarization input.

10. The method of claim 8, further comprising calculating the determinant according to the following equation:

$$\rho_{k+1}(\Omega_m, 0) = \rho_k(\Omega_m, 0)e^{j\alpha\sum_{i=0}^{k}\Delta\hat{n}_d(i)}$$

where $\rho_k(\Omega_m, 0) = e^{-j4\Delta n_d\Omega_m}e^{-jN_{fft}\Omega_m}(P(\Omega_m)P(-\Omega_m))^2$, where $$\Delta n_d = n_d - \frac{N_{fft}}{4},$$

where $n_d$ is a group delay at impedance $\Omega=0$,
where $N_{fft}/2$ is the number of the plurality of taps, and
where $P(\Omega_m)$ is a real positive number related to the magnitude of the frequency response of the compensated input signal.

11. The method of claim 8 further comprising estimating a group delay $n_d$ from the plurality of taps signals.

12. The method of claim 8 wherein the compensated input signal comprises an input signal compensated by an adaptive FD equalizer module.

13. The method of claim 8 wherein the compensated input signal comprises an input signal compensated by a Chromatic Dispersion (CD) equalizer module and by a Polarization Mode Dispersion (PMD) equalizer module; and
   wherein the plurality of taps signals comprises a plurality of PMD tap s signals from the PMD equalizer module.

14. A method of operating an opticalcommunication system having a transmitter device coupled to a receiver device via an optical channel, the method comprising:
   compensating, using a compensation module of the receiver device having a plurality of taps, an optical signal from the transmitter device over the optical channel resulting in a compensated input signal;
   calculating a determinant of a frequency-domain (FD) coefficient-based matrix using a plurality of tap signals from the plurality of taps of the compensation module;
   adjusting an error of convergence $\Delta n_d$ of the compensated input signal resulting in an adjusted input signal;
   filtering the adjusted input signal resulting in a filtered input signal; and
   providing the filtered input signal to iteratively adjust the determinant of the FD coefficient-based matrix to minimize the error of convergence.

15. The method of claim 14 wherein the optical signal is a dual-polarization signal with an x-type polarization signal component and a y-type polarization signal component.

16. The method of claim 14 wherein the compensation module includes a non- adaptive frequency-domain (FD) equalizer, an adaptive FD equalizer, or both.

17. The method of claim 14 further comprising iteratively adjusting the determinant according to the following equation:

$$\rho_{k+1}(\Omega_m, 0) = \rho_k(\Omega_m, 0)e^{j\alpha\sum_{i=0}^{k}\Delta\hat{n}_d(i)}$$

where $\rho_k(\Omega_m, 0) = e^{-j4\Delta n_d\Omega_m}e^{-jN_{fft}\Omega_m}(P(\Omega_m)P(-\Omega_m))^2$, where $$\Delta n_d = n_d - \frac{N_{fft}}{4},$$

where $n_d$ is a group delay at impedance $\Omega=0$,
where $N_{fft}/2$ is the number of the plurality of taps, and
where $P(\Omega_m)$ is a real positive number related to the magnitude of the frequency response of the optical signal.

18. The method of claim 17 further comprising estimating the group delay $n_d$ from the plurality of taps.

19. The method of claim 14 further comprising increasing a sampling rate of the optical signal; and
   deriving a data stream from the optical signal.

20. The method of claim 14 wherein compensating the optical signal includes compensating for chromatic dispersion (CD) affecting the optical signal; and
   compensating for polarization mode dispersion (PMD) affecting the optical signal;
   wherein the plurality of taps includes a plurality of PMD taps configured to compensate for PMD.

\* \* \* \* \*